Figure 1:
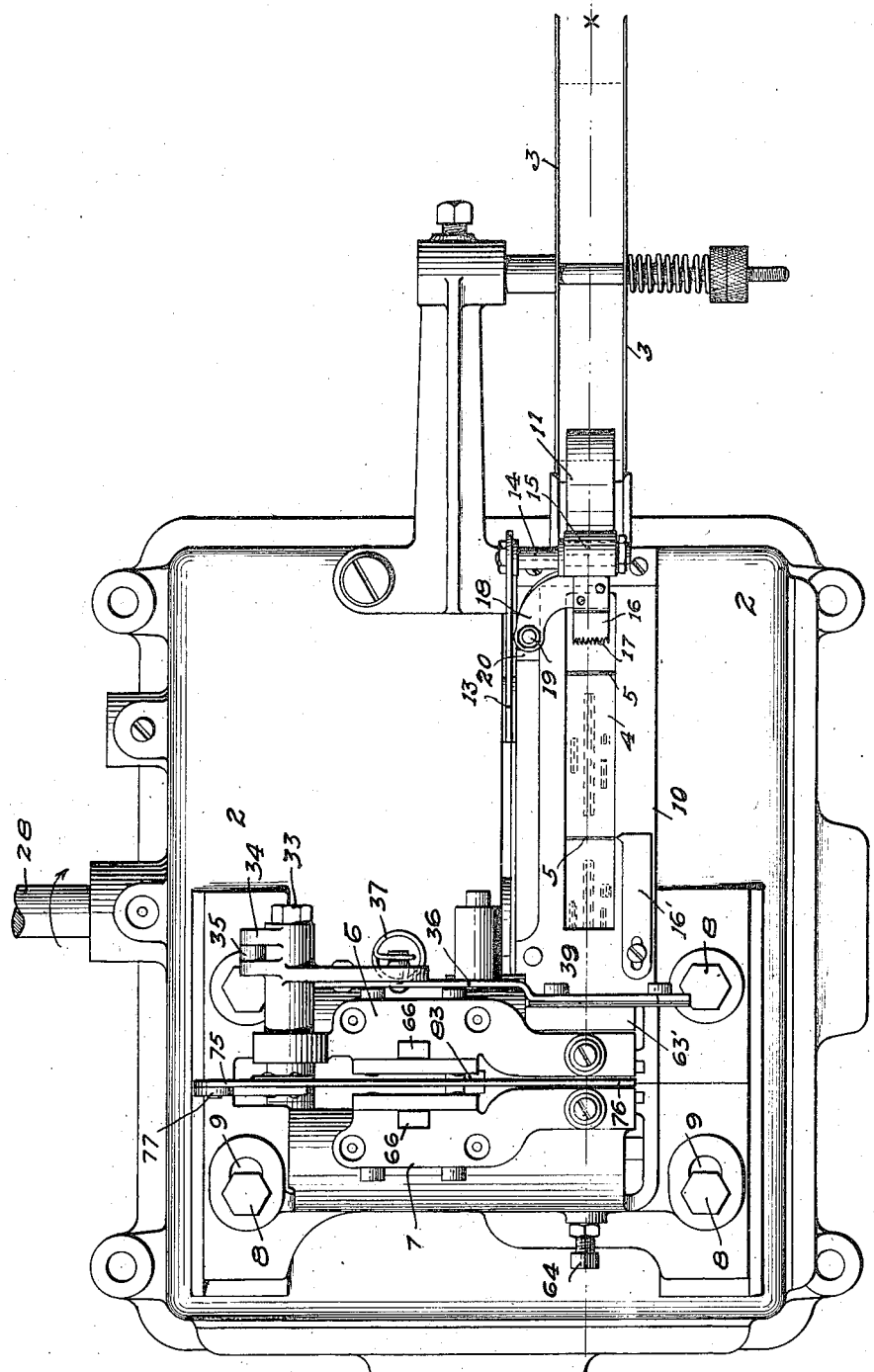

F. CHATFIELD.
MACHINE FOR FEEDING AND CUTTING LABELS.
APPLICATION FILED DEC. 26, 1912.

1,210,761.

Patented Jan. 2, 1917.
7 SHEETS—SHEET 1.

WITNESSES
G. E. Sorensen
E. A. Paul

INVENTOR
FRANKLIN CHATFIELD
By Paul & Paul
ATTORNEYS.

F. CHATFIELD.
MACHINE FOR FEEDING AND CUTTING LABELS.
APPLICATION FILED DEC. 26, 1912.

1,210,761.

Patented Jan. 2, 1917.
7 SHEETS—SHEET 2.

SECT. X—

WITNESSES
G. E. Sorensen
E. A. Paul

INVENTOR
FRANKLIN CHATFIELD
By Paul & Paul
ATTORNEYS

F. CHATFIELD.
MACHINE FOR FEEDING AND CUTTING LABELS.
APPLICATION FILED DEC. 26, 1912.
1,210,761.
Patented Jan. 2, 1917.
7 SHEETS—SHEET 3.
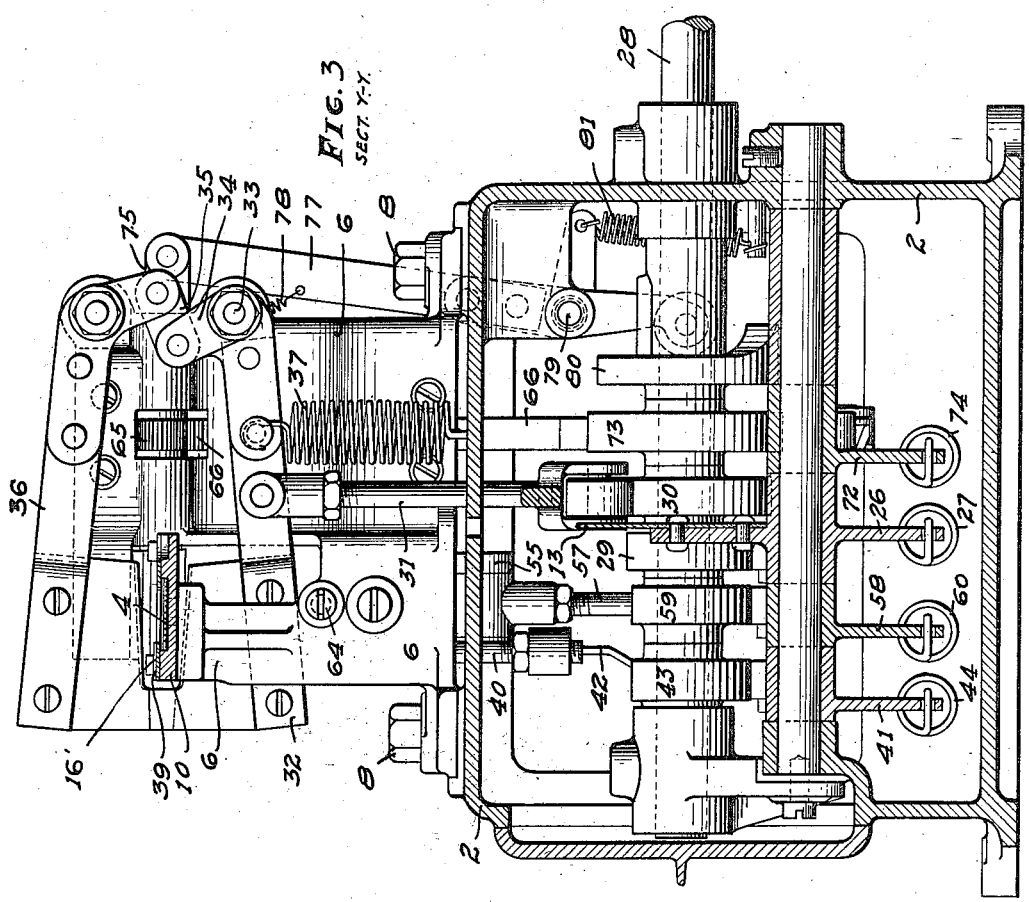
WITNESSES
INVENTOR
FRANKLIN CHATFIELD
BY
ATTORNEYS F. CHATFIELD.
MACHINE FOR FEEDING AND CUTTING LABELS.
APPLICATION FILED DEC. 26, 1912.
1,210,761.
Patented Jan. 2, 1917.
7 SHEETS—SHEET 4.
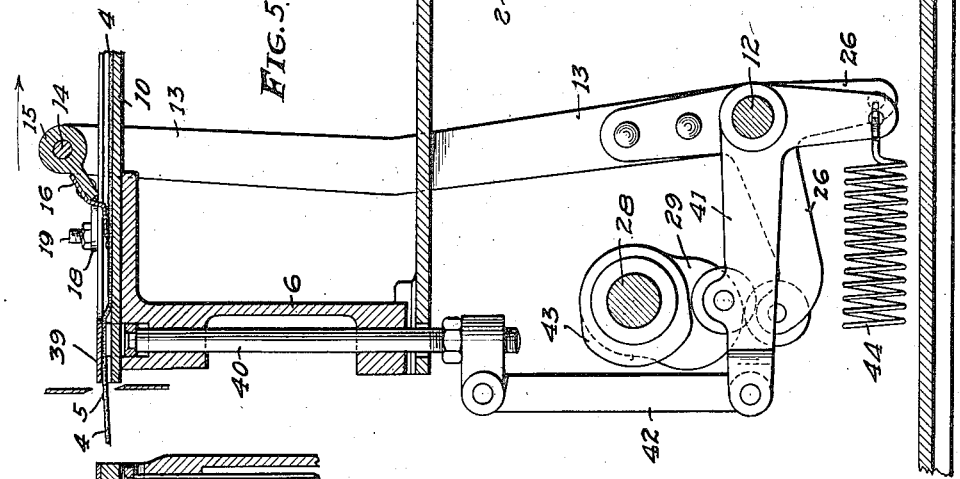
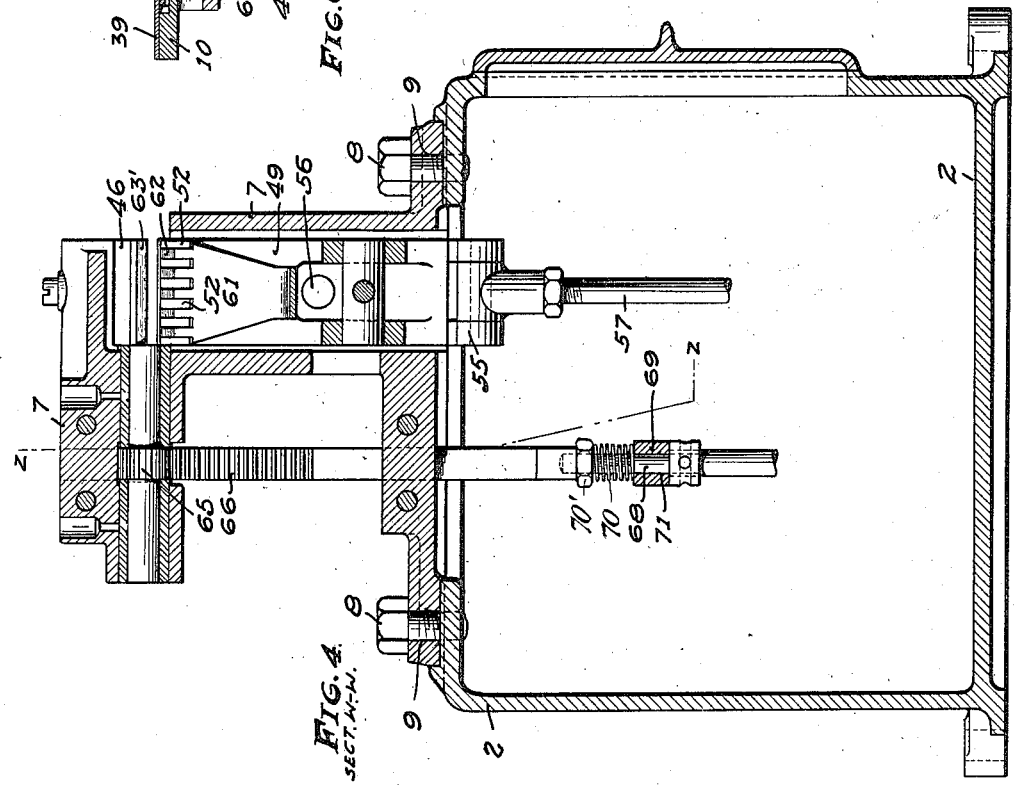
WITNESSES
G. E. Sorensen
E. A. Paul
INVENTOR
FRANKLIN CHATFIELD
BY Paul & Paul
ATTORNEYS F. CHATFIELD.
MACHINE FOR FEEDING AND CUTTING LABELS.
APPLICATION FILED DEC. 26, 1912.
1,210,761.
Patented Jan. 2, 1917.
7 SHEETS—SHEET 5.
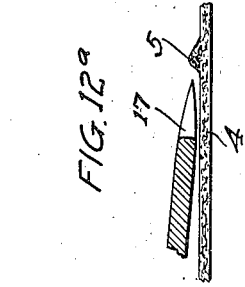
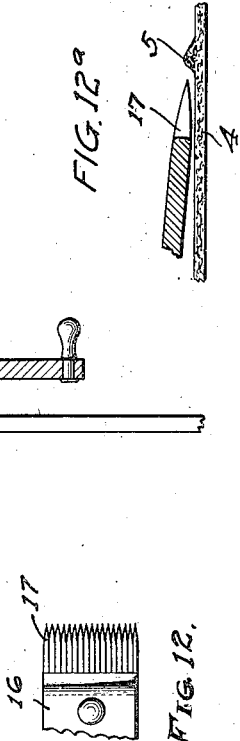
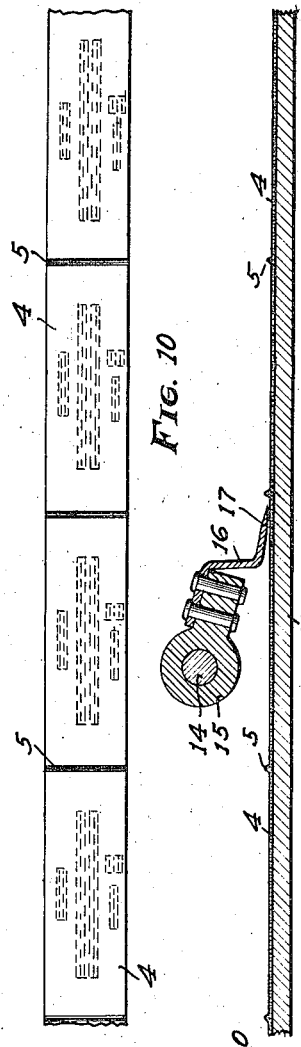
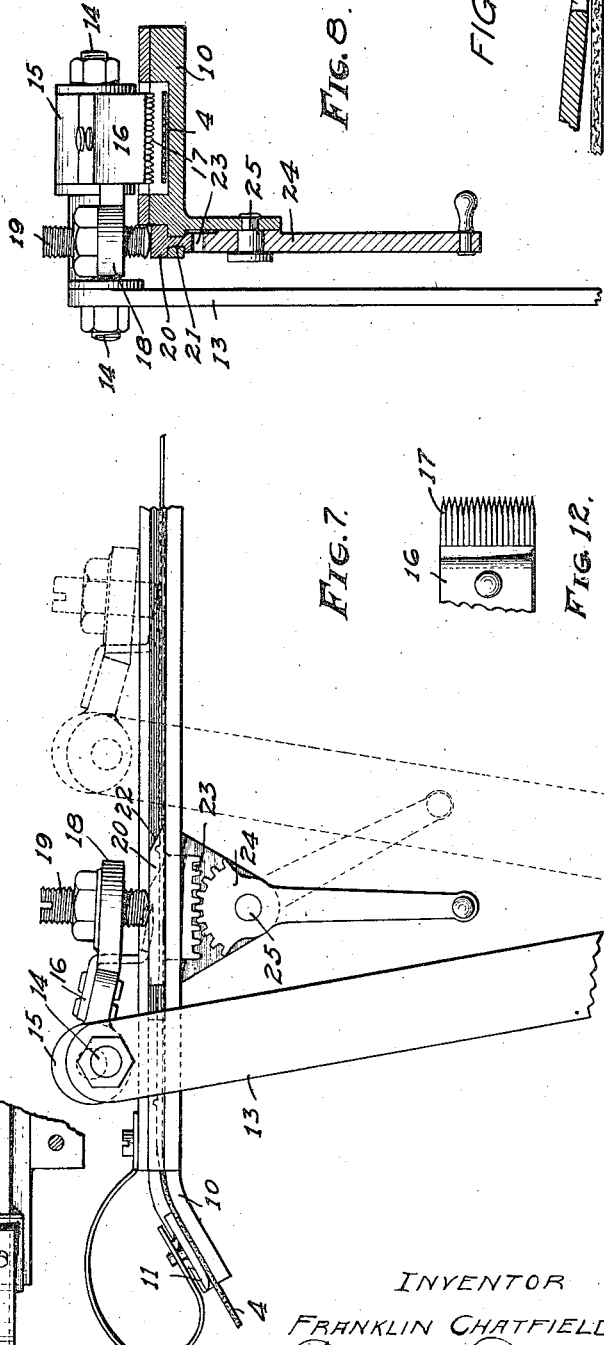
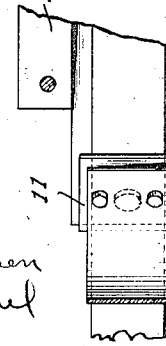
WITNESSES
G. E. Sorensen
E. A. Paul
INVENTOR
FRANKLIN CHATFIELD
By Paul & Paul
ATTORNEYS.

F. CHATFIELD.
MACHINE FOR FEEDING AND CUTTING LABELS.
APPLICATION FILED DEC. 26, 1912.
1,210,761.
Patented Jan. 2, 1917.
7 SHEETS—SHEET 6.
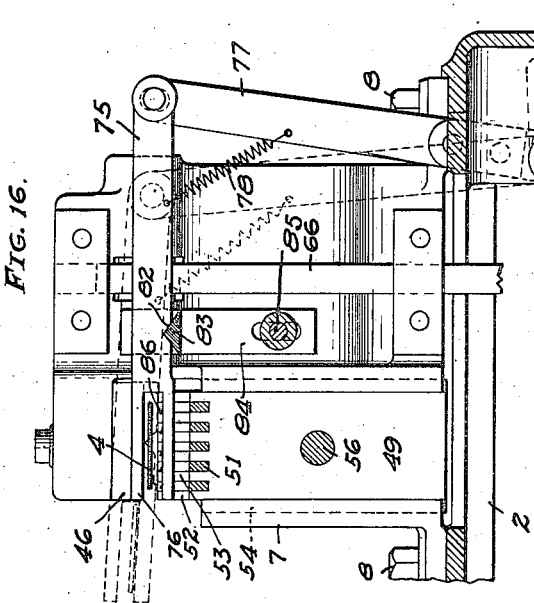
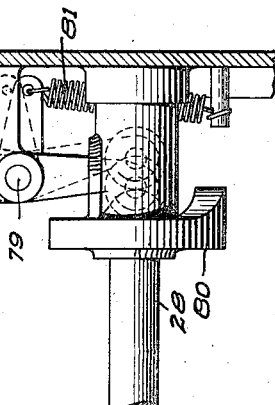
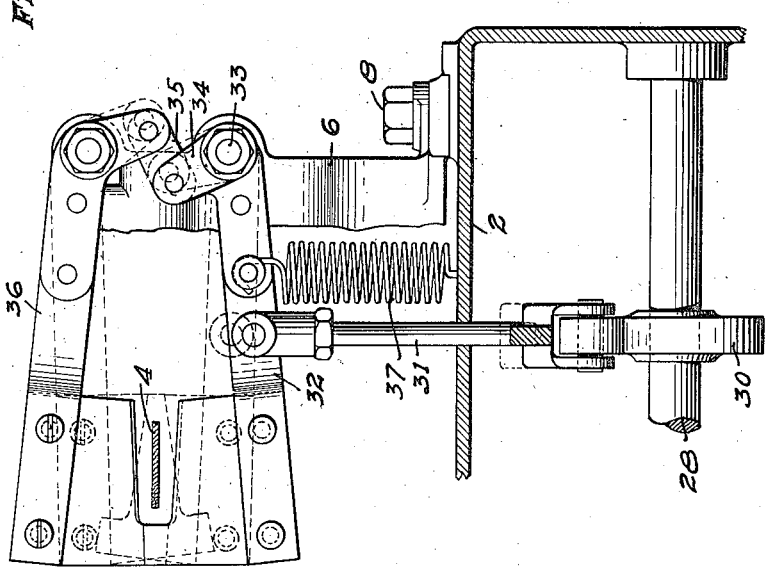
WITNESSES
INVENTOR
FRANKLIN CHATFIELD
ATTORNEYS.

F. CHATFIELD.
MACHINE FOR FEEDING AND CUTTING LABELS.
APPLICATION FILED DEC. 26, 1912.
1,210,761.
Patented Jan. 2, 1917.
7 SHEETS—SHEET 7.
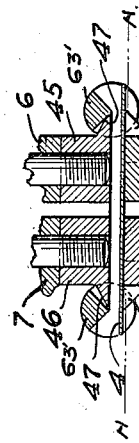
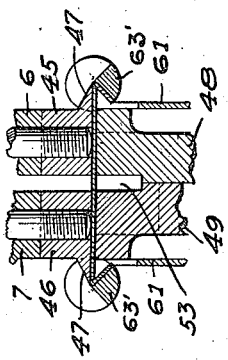
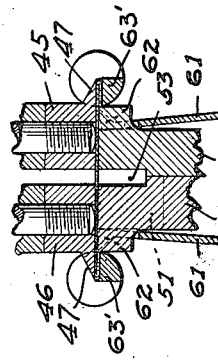
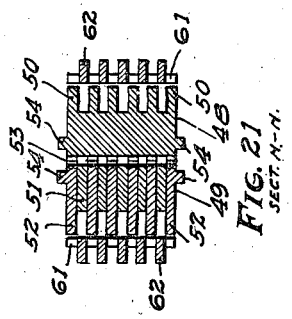
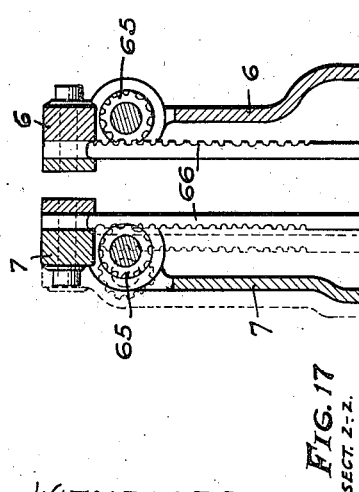
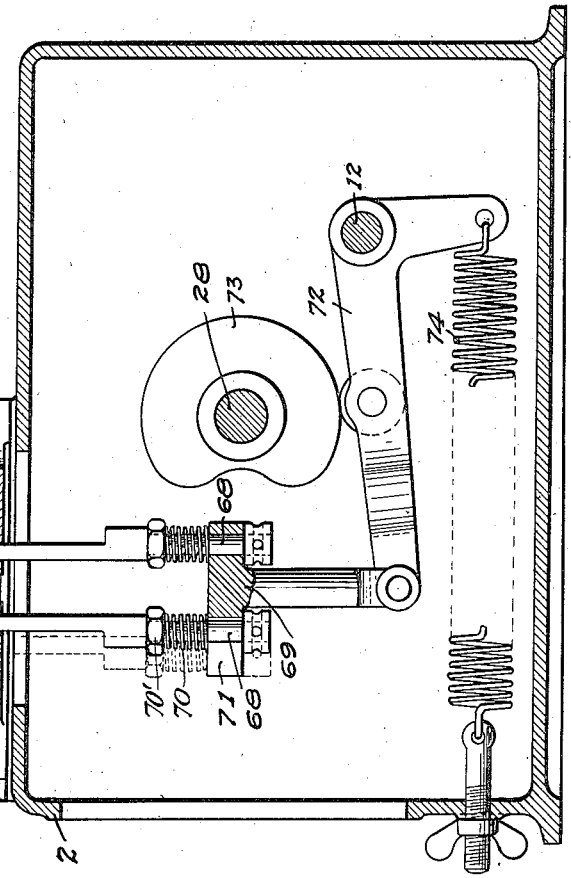
WITNESSES
G. E. Sorensen
E. A. Paul
INVENTOR
FRANKLIN CHATFIELD
By Paul & Paul
ATTORNEYS.

UNITED STATES PATENT OFFICE.

FRANKLIN CHATFIELD, OF MINNEAPOLIS, MINNESOTA, ASSIGNOR TO ROSE PATCH AND LABEL COMPANY, OF GRAND RAPIDS, MICHIGAN, A CORPORATION OF MICHIGAN.

MACHINE FOR FEEDING AND CUTTING LABELS.

1,210,761.        Specification of Letters Patent.        Patented Jan. 2, 1917.

Application filed December 26, 1912. Serial No. 738,702.

*To all whom it may concern:*

Be it known that I, FRANKLIN CHATFIELD, a citizen of the United States, residing at Minneapolis, Hennepin county, Minnesota, have invented certain new and useful Improvements in Machines for Feeding and Cutting Labels, of which the following is a specification.

The object of my invention is to provide means for feeding a tape bearing marks or characters at intervals and severing the tape transversely between the characters to form a series of labels, and to so feed and cut the tape that the labels will be of uniform length and the advertising matter or marks thereon properly centered with respect to the ends of the labels.

A further object is to provide means for turning under the raw ends of the labels to facilitate the fastening of the same to a garment.

Other objects of the invention will appear from the following detailed description.

The invention consists generally in various constructions and combinations, all as hereinafter described and particularly pointed out in the claims.

Figure 2:
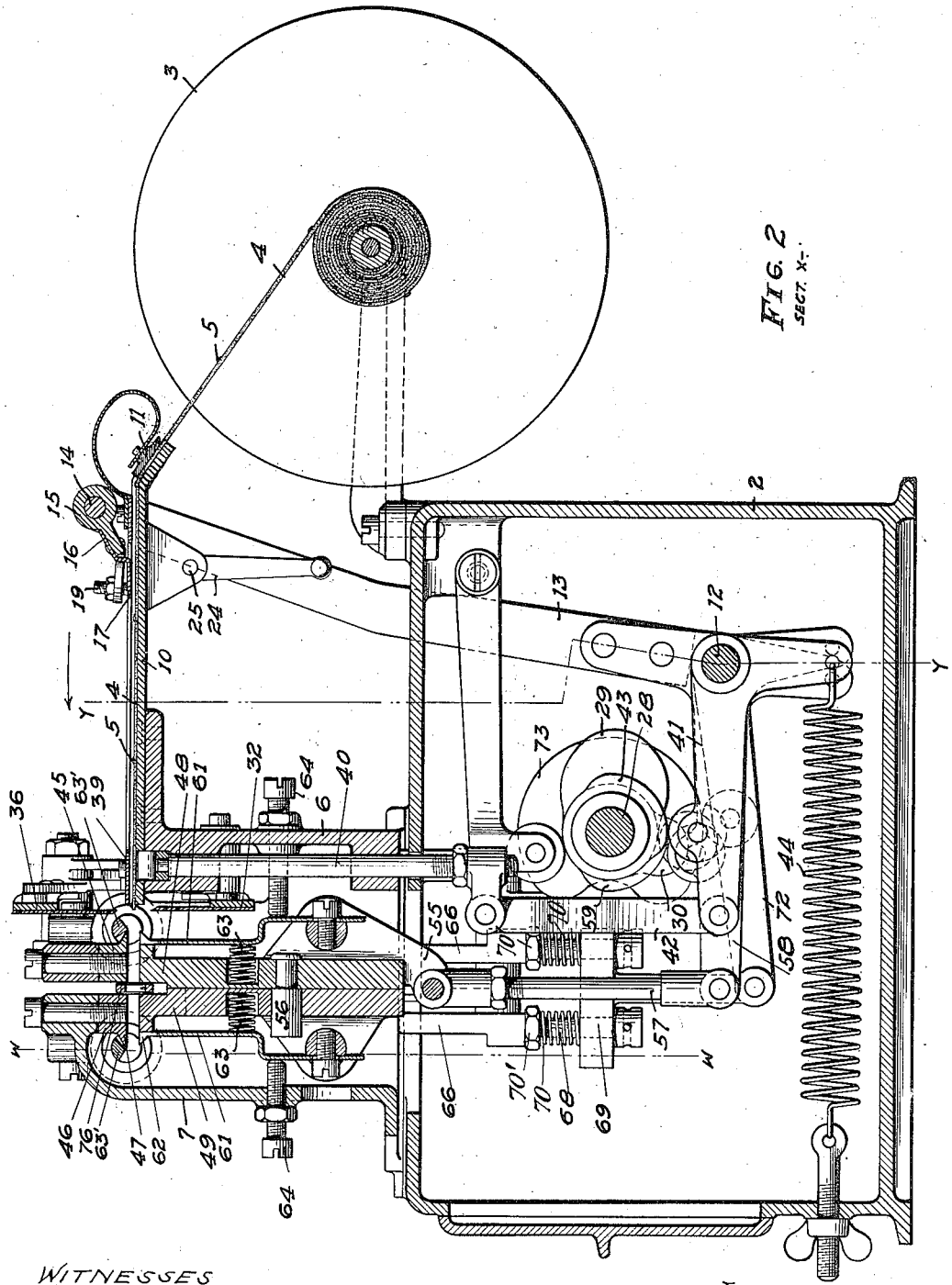

In the accompanying drawings forming part of this specification, Figure 1 is a plan view of a label cutting machine embodying my invention, Fig. 2 is a vertical longitudinal, sectional view of the same, on the section line x—x of Fig. 1, Fig. 3 is a sectional view on the line y—y of Fig. 2, looking in the direction of the arrow, Fig. 4 is a detail sectional view on the line w—w of Fig. 2, Fig. 5 is a detail sectional view, showing the label feeding means and the means for gripping the tape during return of feeder, Fig. 6 is a detail view of the label gripping means, Fig. 7 is a detail view of the label feeding device, showing the means for timing the engagement of the feeder with the tape, Fig. 8 is a transverse sectional view through the feeder mechanism shown in Fig. 7, Fig. 9 is a sectional view showing the tape way and the weft, which I prefer to form at intervals crosswise of the tape, Fig. 10 is a detail view of the preferred from of tape, Fig. 11 is a detail view of the spring tension which I prefer to provide for the tape, Fig. 12 is a detail view showing the needles in the edge of the feeder, Fig. 12ᵃ is a detail sectional view showing the beveled ends of the needles adjusted to normally slip over the surface of the tape, Fig. 13 is a detail sectional view of the label severing means, Fig. 14 is a detail sectional view of the means I prefer to employ for ejecting the finished label from the machine, Figs. 15 and 16 are detail views illustrating the steps in the ejecting operation, Fig. 17 is a detail sectional view on the line z—z of Fig. 4, Figs. 18, 19 and 20 are detail sectional views showing the successive steps in the operation of turning in the raw ends of the label, Fig. 21 is a sectional view on the line n—n of Fig. 18.

In the drawing, (Figs. 1 and 2), 2 represents a casing, in which the operating mechanism embodying my invention is mounted.

3 is a reel, suitably mounted on the casing and supporting a tape 4 from which the labels are formed. This tape is made of suitable fabric and has woven therein marks or characters designating the origin of the goods to which the label is attached. These marks or characters are spaced apart uniformly in or on the tape and preferably the severing line between the labels is indicated by a weft 5, forming a transverse rib on the tape, as indicated in Figs. 9 and 10. This weft is engaged by the feeder to advance the tape, as will hereinafter appear, and also facilitates the adjustment of the feeder to time it properly with respect to the characters on the labels and the severing knives.

Upon the casing two brackets 6 and 7 are mounted and secured by bolts 8, the bracket 7 having slotted openings 9 to receive the bolts and allow the adjustment of the bracket 7 toward or from the bracket 6. Upon the bracket 6 is a feed plate 10 having a flat upper surface adapted to receive the tape 4 and having at its receiving end a spring-pressed tension device 11 for holding the tape against the feed plate and regulating the feed thereof (Fig. 2).

12 is a shaft mounted in bearings in the casing and on this shaft an arm 13 is journaled and adapted to oscillate in a slotted opening in the top of the casing. The upper end of the arm 13 extends to a point above the feed plate 10 and is provided with a spindle 14 on which a sleeve 15 is mounted (Figs. 2, 8 and 9). A plate 16 is secured to said sleeve and is provided with a series of needles 17 having rounded forward ends that are adapted to engage the tape or the weft 5 thereon to feed the tape to the cutting knives. I prefer to use needles having points as illustrated in Fig. 12ª, to slide over the thin portion of the tape without contacting therewith, but engage the thicker portion or weft. These needles are preferably arranged close together to present a series of points to the weft and engage it sufficiently for feeding purposes without penetration.

The sleeve 15 is provided with a laterally extending arm 18 in which a screw 19 is adjustably mounted. The lower end of the screw is rounded and adapted to ride on a block 20 that is slidable in a guide 21 in the feed plate and has a beveled forward end 22. The under side of the block is provided with a series of teeth 23 which mesh with corresponding teeth on a quadrant lever 24 that is pivoted at 25, and depends below the feed plate and is adapted to rock back and forth or move the block 20 in its guide and shift its position in respect to the feeder. When the screw 19 rides up onto the block, the feeder will be lifted out of engagement with the tape and be temporarily rendered inoperative, and evidently, by the adjustment of the block 20, back and forth, the operator of the machine can time the engagement of the feeder with the tape so that the tape will be cut a uniform distance from the marks or characters thereon and the labels will be of uniform length. It is of course important that the feed of the tape be properly timed with the movement of the shearing knives, otherwise the tape would be cut unevenly with respect to the marks or characters and any unevenness in the starting of the feed would soon become magnified to such an extent that the knives might cut through the characters or marks themselves on the labels instead of a uniform distance between them. (Figs. 7 to 9.) I, therefore, regard this means for adjusting the feeder or timing its movement as an important feature of the invention. When the machine is in operation, the feeder in its initial movement will be raised by the block 20 out of contact with the tape and will pass over the marks or characters thereon. Upon sliding down over the beveled end of the block 20 the feeder plate will engage a weft 5, or if preferred, with the surface of the tape itself and feed the tape a predetermined distance toward the severing knives.

As shown in Fig. 1, I prefer to provide a gage plate 16' adjustably mounted on the tape guide and having a pointer that is arranged to move along the edge of the tape and be set opposite to the point where the tape is to be severed. The distance between this pointer and the knives determines the length of the label and by adjusting the feeder so that its stroke terminates or the label weft will be opposite the pointer I am able to easily and quickly adjust the machine for cutting labels of uniform length with each operation. If for any purpose it is desired to change the length of the labels the gage 16' is re-adjusted to increase or decrease the distance of its pointer from the knives, and then the effective stroke of the feeder is modified to correspond with the adjustment of the gage plate.

The hub of the feeder arm 13 is provided with a depending arm 26 to which a coil spring 27 is attached, said spring operating to swing the arm to hold the feeder at the limit of its outward movement (Figs. 2 and 3). A shaft 28 is journaled in bearings in the casing and provided with a cam 29 that is adapted to contact with a horizontal extension of the arm 26 to force the feeder arm forwardly against the tension of its spring and feed the tape. The movement of the arm 13, as far as the cam is concerned, will be uniform at all times, but the effective movement of the feeder will be regulated by the adjusting mechanism heretofore described.

Adjacent to the feeder cam 29 is a knife operating cam 30 arranged to actuate an arm 31 that is pivotally connected with one blade 32 of a severing knife that is pivoted at 33 and has an arm 34 connected by a link 35 with a similar arm on the opposite knife blade 36. This pivotal connection between the knife blades operates to effect the uniform simultaneous movement thereof toward one another to sever the tape, the knives being normally separated by the tension of a spring 37 (Fig. 3). This spring also serves to hold the arm 31 in operative engagement with the surface of the knife operating cam.

A feed plate is provided near the severing knives with a plate 39 beneath which the tape is fed, and a plunger 40 is vertically slidable in guides in the bracket 6 and is adapted to contact with the under surface of the tape and force it upwardly against the plate 39 and clamp it securely on one side of the knives during the return of the feeder. An arm 41 is mounted on the shaft 12 and connected by a link 42 with the plunger 40 and held in engagement with the cam 43 on the shaft 28 by the tension of a spring 44. The connection of the link 42 with the plunger is preferably made adjustable, as shown in Fig. 2, to allow the stroke of the plunger to be regulated. The plunger also prevents the tape from sliding backward on the return stroke of the feeder.

On the other side of the severing knives from the plunger 40 I provide stationary jaws 45 and 46 mounted respectively in the brackets 6 and 7 and having beveled outer edges 47 at their lower ends. (See Figs. 18, 19 and 20). Movable jaws 48 and 49 are arranged beneath the stationary jaws and provided with flattened upper faces to cooperate with the corresponding faces of the stationary jaws. The jaw 48 has a series of teeth 50 formed by slotting the upper outer face of the jaw and also has a series of teeth 51 on the inner face of the jaw. The upper portion of the jaw 49 has a series of teeth 52 adapted to slide between the teeth 51, the inner upper portions of the teeth 51 and 52 having a transverse slot or recess 53 formed therein, both jaws having vertical ribs 54 formed thereon and slidable in suitable guides in the brackets 6 and 7. The jaw 48 is preferably mounted on a carrier 55 and is provided with a pin 56 on which the jaw 49 is capable of sliding toward or from the jaw 48 to increase or decrease the bearing surfaces of the jaws and adapt the machine for working on labels of different lengths. This adjustment is effected by loosening the bolts securing the bracket 7 to the casing and moving the bracket and the jaws 46 and 49 outwardly, away from the jaws 45 and 48 and the interlocking arrangement of the teeth 51 and 52 will permit such adjustment without forming a gap between the jaws into which a portion of the tape or label might drop. The carrier 55 is connected to a rod 57 that is attached to an arm 58 mounted on the shaft 12 and held in yielding engagement with a cam 59 on the shaft 28 by a spring 60 (Figs. 2 and 3).

Mounted on the jaws 48 and 49 are plates 61 having beveled teeth 62 formed at their upper ends and adapted to slip in between the teeth 50 and 52 and normally held out of interlocking engagement with said teeth by means of springs 63. Adjusting screws 64 are mounted in the brackets 6 and 7 for the purpose of holding the plates 61 in proper position with respect to the jaws 48 and 49 (see Fig. 2). The beveled edges of the teeth 62 are beneath and opposite the edges 47 of the stationary jaws and contact therewith when the jaws are closed. When the tape is fed between the jaws they will close gripping the label firmly, and the label will then be severed with its raw or unfinished edges projecting beyond the jaws on each side. For the purpose of folding these edges inwardly to facilitate sewing the label to a garment I prefer to provide spindles 63' rotating in bearings in the brackets respectively, said spindles being sector-shaped in cross section and mounted to swing around the beveled edges 47, said edges being concentric with the axes of the spindles. The spindles will normally occupy the position shown in Fig. 18 and when revolved their flattened outer faces will engage the projecting ends of the label and bend them downwardly and inwardly around the edges of the teeth 62. The successive steps of the folding operation are illustrated in Figs. 18, 19 and 20. In Fig. 18 the label is shown resting upon the movable jaws, but is not severed until the jaws are closed. In Fig. 19 the jaws have been closed, clamping the label between them and the spindles have been partially rotated to fold the ends of the label down under the teeth 62 and during the final movement of the spindles the pressure on the teeth 62 will force them inwardly between the teeth of the jaws 48 and 49 and allow the ends of the label to be pressed firmly against the under faces of the jaws 47, thereby completing the fold at each end of the label and preparing it for attachment to the garment. The yielding plates 61 and their teeth form supports for the end portions of the label and the edges of the teeth crease the labels transversely in the initial movement of the folding spindles and then are pressed inwardly by the folders to allow the fold to be completed and the ends pressed and creased so that they will remain in their folded position when the label is discharged from the machine. The shanks of the spindles are preferably provided with pinions 65 arranged to engage rack bars 66 vertically slidable in the brackets 6 and 7, and having adjusting screws 68 at their lower ends, slidable in a cross head 69. Springs 70 are mounted on these adjusting screws between the cross head 69 and jam nuts 70'. These springs form yielding backings for the movable jaws and allow them to compensate for variation in the thickness of the labels. One of the pinions has a slotted connection at 71 with the cross head to allow the convenient disengagement of the rack bar from the cross head and also to compensate for the adjustment of the rack bar supporting brackets to adapt the machine for labels of different lengths. The cross head 69 is pivotally connected with an arm 72 mounted on the shaft 12 and yieldingly held in engagement with a cam 73 on the shaft 28 by means of a spring 74. (Figs. 2 and 17).

The final step in the label forming operation is the ejection of the completed label from the machine. This I prefer to accomplish by the following described means: Referring to Fig. 14, 75 represents an ejector arm having a forked end 76 which projects into the transverse slot 53, the arms of the fork straddling the label which is fed in between them preparatory to clamping the label between the jaws. The upper arm of the ejector fork partially fills the slot 53 above the jaw opening and prevents the corners of the label from catching and also prevents any fold or pucker in the label from entering the space between the stationary jaws. The lower arm of the fork is normally below the upper bearing surfaces of the movable jaws, as indicated in Figs. 2 and 14. The outer end of the ejector arm is pivoted to an oscillating arm 77 and held in a depressed position by a spring 78 and said arm 77 is pivoted at 79 on the casing and has its lower end in the path of a cam 80 on the shaft 28 and is yieldingly held in contact with the cam by a spring 81. The ejector arm has a notch 82 in its lower edge that is adapted to receive a bar 83 that is triangular in cross section and is carried by a plate 84 adjustably mounted on the frame 7 by means of a screw 85. The engagement of the notched lower edge of the ejector arm with the bar 83 serves to raise the ejector during its initial movement and lift the label clear of the movable jaws. When this lifting movement has been completed the cam 80 will engage and oscillate the arm 77 and move the ejector arm longitudinally to the position shown by dotted lines in Fig. 14 and eject the label from between the jaws and out of the machine. The arm 77 having then passed off the high point of the cam 80 will be returned by its spring with the ejector arm to its normal position. The lower arm of the ejector is preferably provided with pin points 86, which engage the middle portion of the label and are inclined in the direction of the ejecting movement of the label. The upward movement of the forked end of the ejector arm bends the label, as shown in Fig. 16, and causes it, on the return stroke of the ejector arm, to contact with the stationary jaws and be disengaged thereby from the ejector, which otherwise might return the label to a point between the jaws. The inclination of the pin points insures their engagement with the label and the disengagement of the label therefrom when it contacts with the jaws on the return stroke of the ejector arm. The degree of the lifting movement of the ejector arm may be regulated by the adjustment of the plate 84, the space between the stationary jaws being sufficient to allow the ejector to move outwardly between them and insure the contact of the label with the stationary jaws on the return stroke of the ejector. The points 86 are arranged to lean in the direction the label moves upon entering the jaws, and also lean in the direction that the label is ejected when the severing and folding operation is completed.

The operation of the machine is as follows: The tape, bearing suitable marks or characters arranged at uniform intervals thereon, is fed into the machine and the feeder adjusted to engage the transverse weft or the tape itself, if preferred, and the engagement of the feeder with the tape is timed so that the weft or that portion of the tape midway between the characters thereon, is fed into the path of the severing knives and held firmly by the engagement of the jaws and clamps on both sides of the knives. The closing of the knives will sever the tape and the severed label which is clamped between the stationary and movable jaws will be firmly held while the ends are bent under and creased. Then upon the separation of the jaws the ejector arm will be operated to lift the label and discharge it from the machine. The operation described will then be repeated.

The machine may be operated by suitable power applied to the shaft 28.

By loosening and removing the bracket 7 the clamping and ejecting mechanism will be exposed for examination or adjustment and by moving the bracket 7 toward or from the bracket 6 the clamping and folding and creasing mechanism may be easily and quickly adapted for labels of different length.

I claim as my invention:

1. The combination, with a tape feeding and severing means, clamping means between which the tape sections are held, said clamping means including rotating spindles having outer faces intersecting the axes of said spindles, the rotation of said spindles operating to fold the ends of the tape.

2. The combination, with a tape feeding and severing means, of means for clamping the severed sections, and rotating means, sector-shaped in cross section, having their outer faces intersecting the axes of said rotating means for engaging and folding the ends of the severed sections.

3. The combination, with means for feeding and severing a tape, of stationary and movable jaws arranged in pairs between which the tape is clamped, said stationary jaws having beveled clamping edges, and means mounted to rotate over said edges for folding the projecting ends of the tape thereon.

4. The combination, with a tape feeding and severing means, of a clamping means comprising stationary and movable jaws arranged in pairs, means for folding the ends of the tape section held between said jaws, one jaw of a pair being adjustable with respect to the other jaw of the same pair to adapt them for clamping tape sections of different lengths.

5. The combination, with a tape feeding and severing means, of stationary and movable jaws between which a tape section is clamped, rotating means mounted to bear on the projecting ends of the tape section for folding it over said stationary jaws, and yielding plates mounted to form a backing for said folding means.

6. The combination, with a tape feeding and severing means, of a clamping device comprising stationary and movable jaws, said stationary jaws having beveled edges formed thereon, the ends of the tape section inserted in said clamping means extending outwardly beyond said beveled edges, and spindles, sector-shaped in cross section, arranged to rotate around said beveled edges and engage and fold the projecting ends of the label.

7. The combination, with a tape feeding and severing means, of clamping means between which the tape sections are held, said clamping means including rotating spindles, sector-shaped in cross section, the outer faces of said edges being coincident with the axes of said spindles, the rotation of said spindles operating to fold the projecting ends of the tape sections around said edges.

8. The combination, with a tape feeding and severing means, of a clamping means between which the severed tape sections are held, said clamping means comprising stationary and movable jaws arranged in pairs, said movable jaws having coöperating interlapping teeth to adapt them for clamping tape sections of different lengths with the ends of the tape extending a predetermined distance beyond the jaws, and means for folding the projecting ends of the tape sections.

9. The combination, with a tape feeding and severing means, of stationary and movable jaws between which the severed tape sections are clamped, said stationary jaws having beveled lower edges, said movable jaws including yieldingly mounted plates having beveled teeth oppositely arranged with respect to the beveled edges of said stationary jaws, and means for folding the projecting ends of a tape section around the teeth of said plates and inwardly against the lower faces of said beveled edges.

10. The combination, with a tape feeding and severing means, of means for clamping the severed sections, said means including stationary and folding jaws, said stationary jaws having beveled lower edges, said movable jaws including spring-pressed plates having beveled teeth opposite and coöperating with said beveled edges, said movable jaws having toothed upper portions adapted to interlap with the teeth of said plates, and means for folding the projecting ends of a tape held between said jaws downwardly against said beveled teeth and around the beveled edges of said stationary jaws.

11. The combination, with a tape feeding and severing means, of stationary and movable jaws between which the severed tape sections are clamped, said movable jaws including yieldingly mounted plates having beveled teeth oppositely arranged with respect to the edges of said stationary jaws and means for folding the projecting ends of a tape section around the teeth of said plates.

12. The combination, with the tape feeding and severing means, of means for clamping the severed tape section and folding the ends thereof, and an ejector having arms between which the severed tape is fed.

13. The combination, with a tape feeding and severing means, of a clamp device between which the severed tape section is gripped, means for folding the ends of the severed tape section, an ejector having a forked end to receive the severed tape section, and means for reciprocating said ejector transversely with respect to the severed tape section to discharge it from said clamping means.

14. The combination, with a tape feeding and severing means, of means for clamping the severed tape section, means for folding the ends of the tape section, said clamp device having a centrally arranged slot or recess therein, an ejector arm having a forked end to straddle the middle portion of the tape section in said recess, and means for reciprocating said ejector arm to discharge the tape section when released by said clamping means.

15. The combination, with a tape feeding and severing means, of means for clamping the severed tape sections, means for folding the ends thereof, said clamping means having a recess or slot therein, an ejector arm projecting into said slot and having a forked end to straddle the middle portion of said tape section, means for reciprocating said ejector arm to discharge said tape section from said clamping means, and means for lifting said ejector arm during its initial movement.

16. The combination, with means for clamping a label, of means for folding the ends of the label over said clamping means, and an ejecting device having a part extending above and below the label in said clamping means for ejecting it when the folding operation is completed.

17. The combination, with means for clamping a label, of means for feeding the label thereto, means for folding the ends of the label, and an ejecting device having arms between which the label is fed to said clamping means.

18. The combination, with a label clamping means, of jaws having beveled edges thereon, the ends of the label extending outwardly beyond said edges, and spindles, sector-shaped in cross section, arranged to rotate around said beveled edges to engage and fold the projecting ends of the label.

19. The combination, with the upper and lower jaws, of means for feeding a label thereto, means for folding the ends of the label, an ejecting device mounted to straddle the label and eject it from said jaws, and means for lifting said ejector to clear the label from said jaws.

20. The combination, with means for feeding a tape, of severing knives operating to sever the tape, means for clamping the tape on both sides of said knives during the severing operation, and rotating means for folding the ends of the severed tape sections.

21. The combination, with means for feeding a tape, of severing knives operating to sever the tape, means for clamping the tape on both sides of said knives during the severing operation and means coöperating with said clamping means for folding the ends of the severed tape sections.

22. The combination with means for feeding and severing a tape, of stationary and movable jaws between which the tape is clamped, and rotating means mounted to fold the projecting ends of the tape upon said clamping means.

23. The combination with means for feeding a tape, of a severing means, means for clamping the tape during the severing operation, the ends of the tape projecting beyond said clamping means on both sides thereof and rotating means for folding said projecting ends.

24. The combination with means for feeding and severing a tape, of means for clamping the tape during the severing operation, the ends of the tape projecting beyond the clamping means, rotating means for folding said projecting ends, and means for ejecting the tape from between said jaws when separated.

25. In an automatic label cutting and folding machine, the combination of a suitable framework, a feed device for feeding the labels, folder and creaser devices for folding and creasing the labels as they are fed, cut off shears comprising an upper and a lower blade, with spring means for actuating the upper blade, and a reel for the label strip, all coacting substantially as described for the purpose specified.

26. In a label cutting and folding machine, the combination of a suitable frame work, means for delivering a patch or label strip, a gripper for engaging the end label thereof, cut off shears disposed to cut off the label, a yielding clamp member associated with said shears to clamp the label strip during the cutting and to hold it after the label has been severed, and means for folding said label.

27. In a machine of the character described, the combination of a suitable frame, a label folder comprising label-length holding jaws, a folding member coöperating therewith, and means for moving one of said devices relatively to the other in a direction transverse to the label-length's face, a strip-retaining device adapted to retain a label strip of which the label-length is a portion, and a cutter adapted to sever the label length from the label strip between the label length holding jaws and said device, coacting for the purpose specified.

28. In an automatic label cutting and folding means, the combination of a frame, a label strip feeding means, a label length holder means adapted to grasp a label length at the end of the label strip, comprising separable jaws, one of said jaws constituting a fold form, means to cut off said label length while embraced by said jaws, and folding means coöperating with said fold form to fold the label while retained by said jaws, as described.

29. In an automatic label cutting and folding machine, the combination of a suitable frame; a label folder comprising label length holding jaws, a folding member coöperating therewith, and means for moving one of said devices relatively to the other in a direction transverse to the label length's face, and a cutter adapted to sever the label length from a label strip, coacting for the purpose specified.

30. In an automatic label folding machine, the combination with a tape feeding and severing means, of clamping jaws to engage the end of said tape and hold the severed label length, means movable relative to said jaws to coöperate therewith and fold the severed ends of the label length, and means for advancing the folded label through and from the machine.

In witness whereof, I have hereunto set my hand this 19th day of December, 1912.

FRANKLIN CHATFIELD.

Witnesses:
GENEVIEVE E. SORENSEN,
EDWARD A. PAUL.